United States Patent
Bayer

(10) Patent No.: US 9,529,375 B2
(45) Date of Patent: Dec. 27, 2016

(54) SINGLE INDUCTOR-MULTIPLE OUTPUT DC-DC CONVERTER, METHOD FOR OPERATING THE SAME AND ELECTRONIC DEVICE COMPRISING THE CONVERTER

(71) Applicant: Texas Instruments Deutschland GmbH, Freising (DE)

(72) Inventor: Erich J. Bayer, Thonhausen (DE)

(73) Assignee: Texas Instruments Deutschland GmbH, Freising (DE)

( * ) Notice: Subject to any disclaimer, the term of this patent is extended or adjusted under 35 U.S.C. 154(b) by 716 days.

(21) Appl. No.: 13/778,347

(22) Filed: Feb. 27, 2013

(65) Prior Publication Data

US 2013/0234513 A1    Sep. 12, 2013

(30) Foreign Application Priority Data

Feb. 28, 2012 (EP) .................................. 12157393

(51) Int. Cl.
| | |
|---|---|
| H02J 3/14 | (2006.01) |
| G05F 1/577 | (2006.01) |
| H02J 1/08 | (2006.01) |
| H02M 3/07 | (2006.01) |
| H02M 3/158 | (2006.01) |
| H02M 1/00 | (2006.01) |

(52) U.S. Cl.
CPC ................. *G05F 1/577* (2013.01); *H02J 1/08* (2013.01); *H02M 3/07* (2013.01); *H02M 3/158* (2013.01); *H02M 2001/007* (2013.01); *H02M 2001/009* (2013.01); *Y10T 307/406* (2015.04)

(58) Field of Classification Search
CPC .. H02M 3/158; H02M 3/07; H02M 2001/009; H02M 3/00; H02J 1/14; H02J 1/08; Y02B 70/1466; H03G 1/00; H03G 1/0088
USPC ...... 307/31, 110, 66, 64; 363/131, 132, 136; 323/223, 282, 224, 266, 271
See application file for complete search history.

(56) References Cited

U.S. PATENT DOCUMENTS

| | | | | |
|---|---|---|---|---|
| 7,782,027 | B2 * | 8/2010 | Williams | H02M 3/07 323/266 |
| 2004/0201281 | A1 * | 10/2004 | Ma | H02M 3/158 307/38 |
| 2008/0211316 | A1 * | 9/2008 | Watanabe | H02M 3/158 307/110 |
| 2008/0231115 | A1 * | 9/2008 | Cho | H02J 1/08 307/41 |
| 2012/0189139 | A1 * | 7/2012 | Ohara | H03G 1/0088 381/107 |
| 2013/0082668 | A1 * | 4/2013 | Tseng | H02M 3/158 323/267 |

\* cited by examiner

*Primary Examiner* — Rexford Barnie
*Assistant Examiner* — Jagdeep Dhillon
(74) *Attorney, Agent, or Firm* — William B. Kempler; Charles A. Brill; Frank D. Cimino

(57) ABSTRACT

Single inductor-multiple output (SIMO) DC-DC converter, having an output node which is coupled to one side of the single inductor to receive a load current. A plurality of output switches which are coupled to the output node for switching the load current from the output node to a plurality of output lines is provided. Each output line has a load capacitor. Further, each output line may comprise a charge pump which is coupled to the output switch and the load capacitor of the output line.

10 Claims, 6 Drawing Sheets

SINGLE INDUCTOR-MULTIPLE OUTPUT DC-DC CONVERTER, METHOD FOR OPERATING THE SAME AND ELECTRONIC DEVICE COMPRISING THE CONVERTER

CROSS-REFERENCE TO RELATED APPLICATIONS

This patent application claims priority from European Provisional Application No. 12157393.5, filed Feb. 28, 2012, which is incorporated herein by reference in its entirety.

FIELD OF THE INVENTION

The invention relates to a single inductor-multiple output DC-DC converter and to a method of operating a single inductor-multiple output DC-DC converter. Further, the invention relates to a portable electronic device comprising a single inductor-multiple output converter.

BACKGROUND OF THE INVENTION

Single inductor-multiple output (SIMO) DC-DC converters have a discontinuous output current which is in principle a non-desired feature determined by the design of SIMO DC-DC converters. The output current of a SIMO DC-DC converter is discontinuous because a single inductor serves a plurality of output lines and a single output line may be served with a load current at a specific moment in time only. During the remaining serving cycle of the respective output line, energy of the single inductor is transferred to the other output lines and a load capacitor which is a part of each output line, must deliver the energy which is requested at the respective output terminal of the SIMO DC-DC converter.

SUMMARY OF THE INVENTION

It is a general object of the invention to provide an improved single inductor-multiple output DC-DC converter, an improved method of operating a single inductor-multiple output DC-DC converter and an improved portable electronic device comprising a single inductor-multiple output DC-DC converter.

In one aspect of the invention, a single inductor-multiple output (SIMO) DC-DC converter is provided. The SIMO DC-DC converter comprises an output node which is coupled to the single inductor. The output node receives a load current from the single inductor. The SIMO DC-DC converter further comprises a plurality of output switches which are coupled to the output node for switching the load current from the output node to a plurality of output lines. Each output line comprises an output terminal and a load capacitor. Further, at least one of the output lines comprises a charge pump which is coupled between the output switch and the load capacitor of said output line. Advantageously, the SIMO DC-DC converter according to aspects of the invention offers a significantly reduced voltage ripple at the output terminal.

The SIMO DC-DC converter according to inspect of the invention may be configured to couple a voltage to the output node which is higher than the predetermined output voltage of a respective output line. In other words, the SIMO DC-DC converter is configured to deliver a voltage to the output node which is higher than the output voltage of the output line which is coupled to the output node at that moment in time. Accordingly, the voltage which is delivered to the output node may change with changing output terminals which are coupled to the output node. Further, the charge pump may be a down-converting charge pump for conversion of the voltage at the output node to the desired voltage at the output terminal.

According to an aspect of the invention, the SIMO DC-DC is configured to provide a voltage to the output node which X-times higher than a predetermined output voltage of an output line which is coupled to the output node. In other words, the voltage at the output node is X-times higher than a desired output voltage of an active output line which is presently coupled to the output node. The charge pump of said output line is a down-converting charge pump which has a transformation ratio of $1/X$ in order to provide the desired voltage at the output terminal. The voltage provided to the output node may be approximately twice the output voltage of the respective output line and the down-converting charge pump reduces the voltage received from the output node by a factor of approximately 0.5.

According to an embodiment of the invention, the charge pump comprises a capacitor having a first terminal which is coupled to the output switch and a second terminal which is coupled to the output terminal of the output line via a third switch. Further, the charge pump comprises a recovery line which bypasses the capacitor. A first switch of the charge pump has a first terminal which is coupled to the second terminal of the capacitor. The first switch has a second terminal which is coupled to ground. A second switch is integrated in the recovery line and serves as a switch for switching the recovery line. A first terminal of this second switch is coupled to the output switch and a second terminal of the second switch is coupled to the output terminal. Further, the third switch of the charge pump comprises has a first terminal which is coupled to the second terminal of the capacitor and to the first terminal of the first switch. The third switch further comprises a second terminal which is coupled to the output terminal of the output line.

According to another aspect of the invention, the SIMO DC-DC converter comprises a control unit which is configured to synchronize the operation of the charge pump of an output line to a power delivery period of the SIMO DC-DC converter at said output line. Preferably, the control unit is configured to synchronize the first to third switch of the charge pump and the output switch of the output line. In other words, the switching periods of the first to third switch are configured such that a synchronized operation of the charge pump and the power delivery period of said output line may be provided.

According to an aspect of the invention, the control unit is further configured to control the first to third switch of the charge pump and the output switch of the output line, i.e. the switching periods of said switches, in that the first and second switch of the charge pump and the output switch have non-overlapping open and closed state periods. The control unit may be further configured to control the third switch of the charge pump and the output switch to have non-overlapping open and closed state periods. Preferably, the control unit is configured to control the first to third switch of the charge pump and the output switch of the output line in that the third switch of the charge pump and the output switch have synchronous switching periods and the first and second switch of the charge pump and the output switch have asynchronous switching periods.

According to above mentioned aspects of the invention, the capacitor of the charge pump is put in series between the inductor and the output terminal during the energy transfer phase at the respective output line. Energy is transferred from the inductor to the output node and depending on the switching status of the output switches via the charge pump of an active output line to the respective output terminal. For instance, the charge pump has a conversion factor of 0.5 and the voltage at the power output node will automatically adjust to a value of about two times the voltage at the selected output terminal, during the energy transfer phase. The capacitor of the charge pump is a "flying" capacitor and is charged to a voltage which is the difference between the voltage at the output node and the voltage at the output terminal. Accordingly, during the remaining cycle time, the capacitor of the charge pump can deliver energy to the output line and the output terminal, respectively. Advantageously, according to the described mode of operation of the SIMO DC-DC converter according to aspects of the invention, the voltage ripple at the output terminal of the SIMO DC-DC converter will be significantly reduced. This may be true for all output lines (which may be configured to deliver different output voltages) of the SIMO DC-DC converter comprising a charge pump. However, it may be desirable to have a mixed configuration which means there are output lines with and without a charge pump.

According to another aspect of the invention, the control unit of the SIMO DC-DC converter is configured to operate the charge pump in a synchronized mode if the SIMO DC-DC converter is operated in a boost converter mode. The charge pump may be operated in a non-synchronized mode, if the SIMO DC-DC converter is operated in buck converter mode. In principle, the boost converter mode has been explained above. The main aspect is that the flying capacitor of the charge pump is capable of delivering energy to the output line during that part or portion of the cycle time which is designated to other output lines of the SIMO DC-DC converter. During this part of the cycle time, the output line in question does not receive energy from the single inductor but from the capacitor of the charge pump. In a buck converter mode, the principle of operation is more or less the same, however, there is a continuous current and there is no gap in the energy transfer from the inductor to the output node. Accordingly, there is no need to synchronize the charge pump to the operation of the output switches of the SIMO DC-DC converter.

The SIMO DC-DC converter comprises a plurality of output lines. The output lines may be coupled to the output node via a plurality of switches, which may be semiconductor switches, such as MOSFETS are applied. Further, the output line may be coupled to the output node via a suitable multiplexer. According to an aspect of the invention, all output lines comprise a charge pump. However, according to another aspect of the invention, it may be desirable to provide only some of the output line with a charge pump and to operate the remaining output lines "conventionally", i.e. without a charge pump. These output lines may be directly coupled to the output switches or the multiplexer, respectively.

According to another aspect of the invention, a method of operating a SIMO DC-DC converter is provided. The SIMO DC-DC converter comprises an output node which is coupled to a single inductor and which is configured to receive a load current from the single inductor. A plurality of output switches are coupled to the output node for switching the load current from the output node to a plurality of output lines, wherein each output line comprises an output terminal. At least one output line comprises a charge pump which is coupled between the output switch and the output terminal of the output line. According to aspects of the invention, the charge pump of a certain output line and a power delivery period of the SIMO DC-DC converter of said output line are synchronized.

A voltage may be coupled to the output node which is higher than the predetermined output voltage of a respective output line. The voltage which is coupled to the output node during the power delivery period of the SIMO DC-DC converter can be X-times higher than a predetermined output voltage for said output line, i.e. an active output line, and the charge pump is a down-converting charge pump having a transformation ratio of 1/X.

According to a preferred embodiment of the invention, the charge pump is a down-converting charge pump and the SIMO DC-DC converter is configured to provide a voltage to the output node which is higher than the predetermined output voltage of a respective output line. Further, the charge pump may comprise a capacitor having a first terminal which is coupled to the output switch and a second terminal which is coupled to the output terminal of the output line via a third switch. The charge pump further comprises a recovery line which bypasses the capacitor. The charge pump comprises a first switch having a first terminal which is coupled to the second terminal of the capacitor. Further, the first switch comprises a second terminal which is coupled to ground. A second switch which is a part of the recovery line is for switching the recovery line and is a further part of the charge pump. The third switch has a first terminal which is coupled to the second terminal of the capacitor and to the first terminal of the first switch. The third switch comprises a second terminal which is coupled to the output terminal of the output line. The charge pump of a certain output line and a power delivery period to said output line are synchronized, which can be by synchronizing the first to third switch of the charge pump and the output switch of the output line. In other words, the switching periods of the respective switches are synchronized.

The first to third switch of the charge pump and the output switch of the output line may be synchronized in that the first and second switch of the charge pump and the output switch have non-overlapping open and closed state periods. In contrast, the third switch of the charge pump and the output switch are synchronized to have overlapping open and closed state periods. Preferably, the third switch of the charge pump and the output switch have synchronous switching periods and the first and second switch of the charge pump and the output switch have asynchronous switching periods. The charge pump may be operated in a synchronized mode if the SIMO DC-DC converter is operated in a boost converter mode and the charge pump may be operated in a non-synchronized mode if the SIMO DC-DC converter is operated in a buck converter mode.

Further advantages of the method according to aspects of the invention have been already mentioned with respect to the SIMO DC-DC converter according to aspects of the invention and are therefore not repeated.

According to another aspect of the invention, a portable electronic device comprising a SIMO DC-DC converter according to aspects of the invention is provided. The electronic device comprises a voltage converter having a reduced output voltage ripple which may be advantageous for further components of the electronic device which are supplied by the SIMO DC-DC converter, for example an AMOLED display in a mobile phone.

BRIEF DESCRIPTION OF DRAWINGS

Further aspects of the invention will appear from the appending claims and from the following detailed description given with reference to the appending drawings:

DETAILED DESCRIPTION OF EXAMPLE EMBODIMENTS

Figure 1:
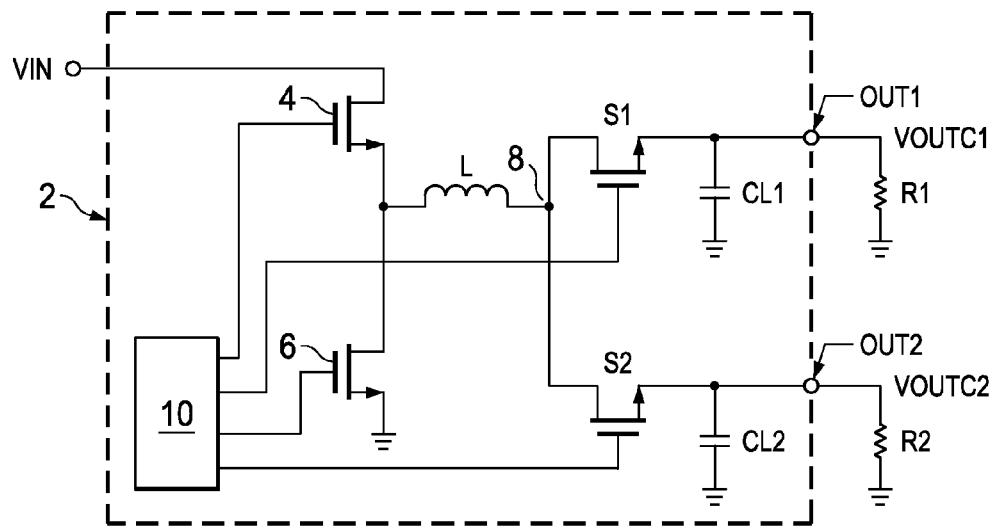
FIG. 1 is a simplified circuit diagram of a SIMO DC-DC converter according to the prior art.

FIG. 1 is a simplified circuit diagram of a single inductor-multiple output (SIMO) DC-DC converter 2, according to the prior art. The SIMO DC-DC converter 2 comprises an input terminal receiving an input voltage VIN. Further, the SIMO DC-DC converter 2 comprises a first and a second switch 4, 6 and a single inductor L which is coupled to the switches 4, 6. The single inductor L is for providing a load current to an output node 8, wherein a first and a second output line are coupled to the output node 8 via a first and a second output switch S1, S2. Further, each output line which comprises an output terminal OUT1, OUT2 is coupled to a load capacitor CL1, CL2, respectively. Each output terminal OUT1, OUT2 is coupled to a resistive load R1, R2 and provides an output voltage VOUTC1 and VOUTC2, by way of an example only. The first and second switch 4, 6 and the first and second output switch S1, S2 are controlled by a control unit 10 which is a further part of the SIMO DC-DC converter 2. Further modules of the SIMO DC-DC converter 2, for example a gate driver, a PWM controller, etc. are omitted, for clarity reasons only.

Figure 2:
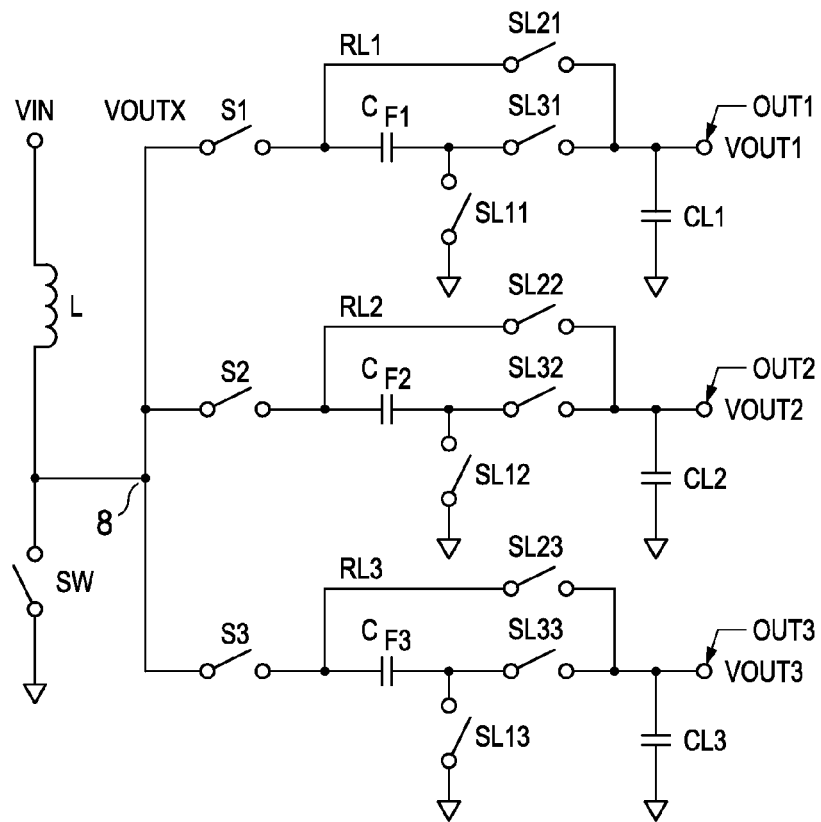
FIG. 2 is a detailed simplified circuit diagram of a SIMO DC-DC converter which is configured to operate as a boost converter, according to an embodiment of the invention.

FIG. 2 is a detailed simplified circuit diagram of a SIMO DC-DC converter according to an embodiment of the invention. The SIMO DC-DC converter is configured to operate in a boost converter mode. A voltage VOUTX is provided at an output node 8. This is performed by boost operation of the single inductor L and the switch SW which are coupled between an input voltage VIN and ground. The SIMO DC-DC converter in FIG. 2 comprises a plurality of output switches S1 ... S3 which are inserted in a respective one of the output lines for delivering an output voltage VOUT1 ... VOUT3 at the output terminals OUT1 ... OUT3. The output switches S1 ... S3 may be implemented by a multiplexer. Each output line comprises a load capacitor CL1 ... CL3. Further, each output line of the SIMO DC-DC converter comprises a charge pump which is inserted in a respective one of the output lines.

The voltage VOUTX which is provided at the output node 8 is preferably X-times greater than the respective output voltage VOUT1 ... VOUT3 at the output terminal OUT1 ... OUT3. In other words, the voltage VOUTX at the output node 8 may change and depends on the selected output line and output voltage VOUT1 ... VOUT3, respectively. According to an embodiment, there may be a multiplexer which comprises the output switches S1 ... S3 and a respective output line is coupled to the output node 8 in regular time intervals. The voltage VOUTX which is coupled to a respective output line if the corresponding output switch S1 ... S3 is closed changes according to the switching scheme of the multiplexer. The transformation ratio of the charge pump is 1/X if the voltage VOUTX at the output node 8 is X-times greater than the output voltage VOUT1 ... VOUT3. In one embodiment, the voltage VOUTX which is provided at the output node 8 may be two times greater than the respective output voltage VOUT1 ... VOUT3 at the output terminal OUT1 ... OUT3. Accordingly, the charge pump may a down converting charge pump having a transformation ratio of 0.5.

Each charge pump comprises a capacitor CF1 ... CF3, a recovery line RL1 ... RL3 bypassing said capacitor CF1 ... CF3, and three switches, namely a first switch SL11 ... SL13, a second switch SL21 ... SL23 and a third switch SL31 ... SL33, respectively. For each charge pump, a first terminal of the capacitor CF1 ... CF3 is coupled to the power switch S1 ... S3 and the opposite and second terminal of the capacitor CF1 ... CF3 is coupled to a respective output terminal OUT1 ... OUT3 via the third switch SL31 ... SL33. Further, each one of the first switches SL11 ... SL13 has a first terminal which is coupled to the second terminal of the capacitor CF1 ... CF3. A second terminal of the first switch SL11 ... SL13 is coupled to ground, respectively. The second switch SL21 ... SL23 is inserted or a part of a respective recovery line RL1 ... RL3 and configured to switch the recovery line RL1 ... RL3. Each charge pump further comprises the third switch SL31 ... SL33 which has a first terminal which is coupled to the second terminal of the capacitor CF1 ... CF3 and to the first terminal of the first switch SL11 ... SL13. A second terminal of the third switch SL31 ... SL33 is coupled to a respective one of the output terminals OUT1 ... OUT3. Preferably, the first to third switch SL11 ... SL13, SL21 ... SL23 and SL31 ... SL33 are semiconductor switches, for example MOSFETS. Advantageously, for a SIMO DC-DC converter operating in boost converter mode it is possible to generate a number of output voltages VOUT1 ... VOUT3 which are above the input voltage VIN and a further number of output voltages VOUT1 ... VOUT3 which are below VIN but above VIN/2 without any special buck-boost topology.

Figure 3:
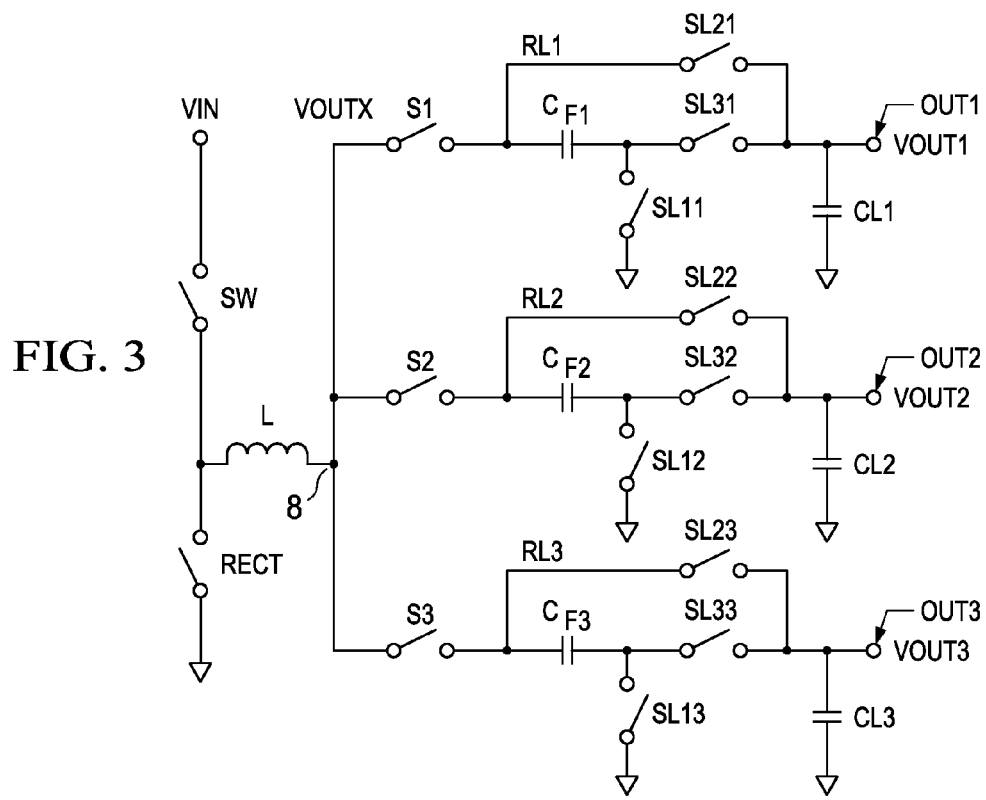
FIG. 3 is a further detailed and simplified circuit diagram of a SIMO DC-DC converter which is configured to operate in a buck converter mode, according to another embodiment of the invention.

FIG. 3 is a further simplified circuit diagram showing a detail of a SIMO DC-DC converter, according to another embodiment of the invention. The SIMO DC-DC converter is configured to operate in a buck converter mode. An input voltage VIN is coupled to a switch SW which is further coupled to a first terminal of the inductor L. The first terminal of the inductor L is further coupled to ground via the switch RECT. A load current is provided by the inductor L at the output node 8 having a voltage VOUTX. Again, the voltage VOUTX may be X-times higher than the desired output voltage VOUT1 ... VOUT3 which is provided at the respective output terminal OUT1 . . . OUT3. The output lines may be coupled to the output node 8 via output switches S1 . . . S3 and a charge pump which is identical to the charge pump in FIG. 2 may be inserted in a respective output line. The inductor average current may be 50% lower when compared to standard SIMO DC-DC converter topologies. This results in a smaller inductor L due to less saturation current and a reduction of inductor losses which is an important aspect for SIMO DC-DC converters.

Figure 4:
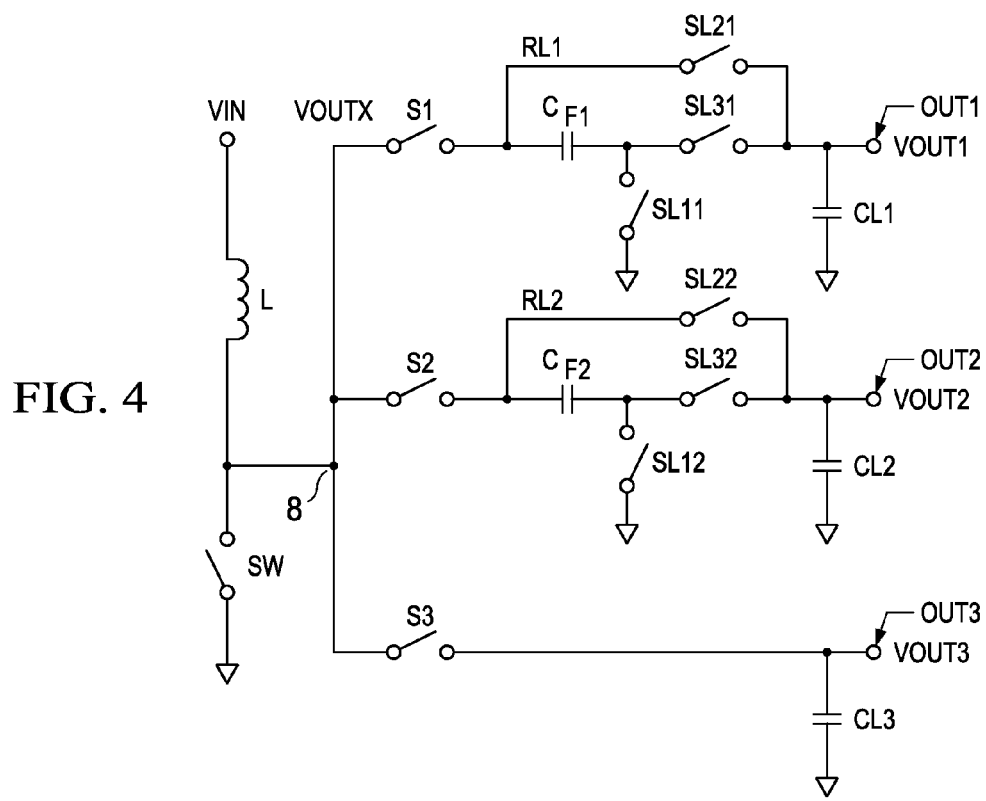
FIG. 4 is another detailed simplified circuit diagram of a SIMO DC-DC converter which is configured to operate in a boost converter mode, wherein the SIMO DC-DC converter comprises output lines having a charge pump and an output line having no charge pump, according to another embodiment of the invention.

FIG. 4 is a further simplified circuit diagram showing a detail of a SIMO DC-DC converter according to another embodiment of the invention. The SIMO DC-DC converter is configured to operate in a boost converter mode providing a voltage VOUTX at the output node 8. According to the embodiment in FIG. 4, a first and a second output line which is coupled to a first and a second output node OUT1, OUT2 comprises a charge pump which is identical to the charge pump of the embodiments in FIGS. 2 and 3. However, the third output line which is coupled to the third output terminal OUT3 is operated in "conventional mode" and does not comprise a charge pump. The output terminal OUT3 is directly connected to the output node 8 via output switch S3.

Figure 5:
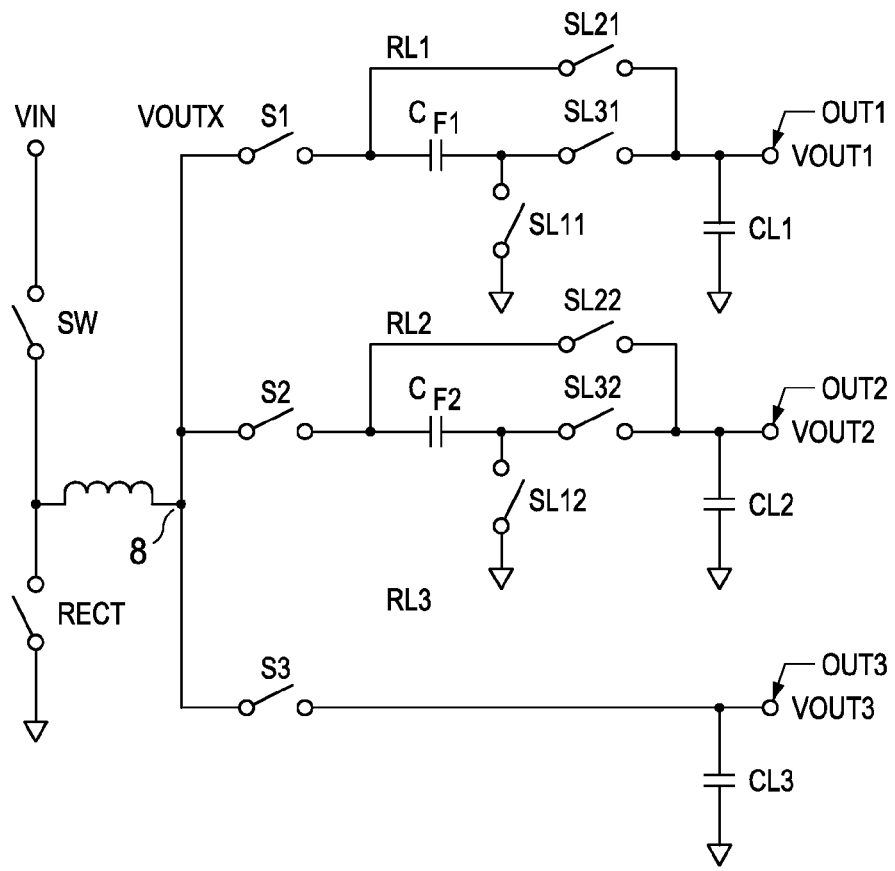
FIG. 5 is a detailed simplified circuit diagram of a SIMO DC-DC converter which is configured to operate in a buck converter mode, wherein the SIMO DC-DC converter comprises output lines having a charge pump and an output line having no charge pump, according to another embodiment of the invention.

A further embodiment of a SIMO DC-DC converter comprising such "mixed" output lines is illustrated in the detailed simplified circuit diagram of FIG. 5. The SIMO DC-DC converter according to this embodiment is configured to operate in a buck converter mode. A first and a second output line which is coupled to a first and a second output terminal OUT1, OUT2 comprises a charge pump which is identical to the charge pump in the embodiments of FIGS. 2 to 4. The third output line which is coupled to a third output terminal OUT3 does not comprise a charge pump.

The operation of the charge pump CP, which is a part of the SIMO DC-DC converter according to embodiments of the invention, will be explained by making reference to the simplified circuit diagrams of FIGS. 6 to 8.

Figure 6:
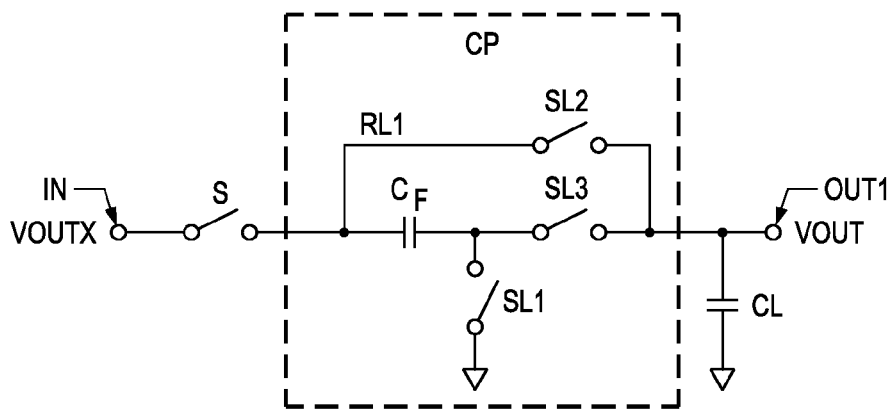
FIGS. 6 to 8 are detailed simplified circuit diagrams illustrating the operation of a charge pump which is a part of a SIMO DC-DC converter according to embodiments of the invention.

In FIG. 6 there is a simplified circuit diagram of the charge pump CP. An input terminal IN receives the voltage VOUTX from the switching node 8 (see FIGS. 1 to 5). The voltage VOUTX is switched via a first output switch S. The charge pump CP comprises a "flying" capacitor CF, a recovery line RL and a first to third switch SL1 . . . SL3. There is a load capacitor CL which is coupled to the output line providing a load voltage VOUT at the power output node OUT. If the SIMO DC-DC converter comprises a plurality of power switches S1 . . . S3 (see FIGS. 1 to 5). The power switches S1 . . . S3 are alternately closed for delivering power to a plurality of power output terminals OUT1 . . . OUT3.

Figure 7:
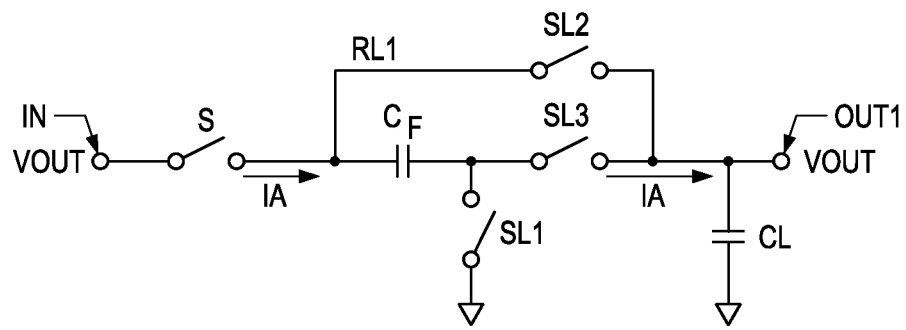

FIG. 7 is a simplified circuit diagram showing the switching status of the charge pump CP during a power delivery period. A load current IA is coupled to the power output node OUT. The power switch S of the respective power output line of the SIMO DC-DC converter 2 is closed and the load current IA is coupled via the capacitor CF of the charge pump CP and the closed third switch SL3 to the power output node OUT. The recovery line RL is interrupted due to the opened second switch SL2.

Figure 8:
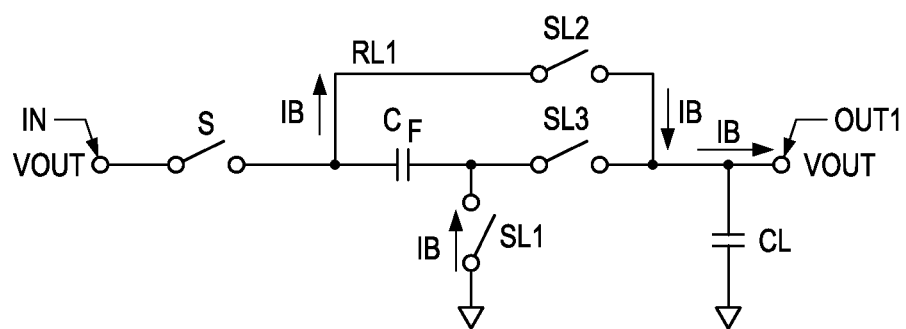

FIG. 8 is a further simplified circuit diagram showing the switching status of the charge pump CP during a remaining cycle time. During this remaining cycle time, other output lines are provided with power from the inductor L. Accordingly, the power switch S is open and there is no load current provided from the power output node 8 to the charge pump CP (see FIGS. 1 to 5). However, the first switch SL1 which is integrated in the recovery line RL and the second switch SL2 are closed and a current IB is provided to the output node OUT from the flying capacitor CF of the charge pump CP. Accordingly, a continuous output current having a significantly reduced voltage ripple may be provided by the SIMO DC-DC converter. The voltage ripple may be up to four times smaller in comparison to SIMO DC-DC converters according to the prior art. The efficiency of the charge pump at the respective output line is about 95%.

In a SIMO DC-DC converter according to an embodiment, each output line of the plurality of output lines may receive a different voltage VOUTX from output node 8 during the power delivery period of said output line. However, it may be preferable to provide all output lines with an identical voltage VOUTX. Both options may be realized and in both scenarios, a reduced voltage ripple is provided at the output terminals OUT1 . . . OUT3.

Figure 9:
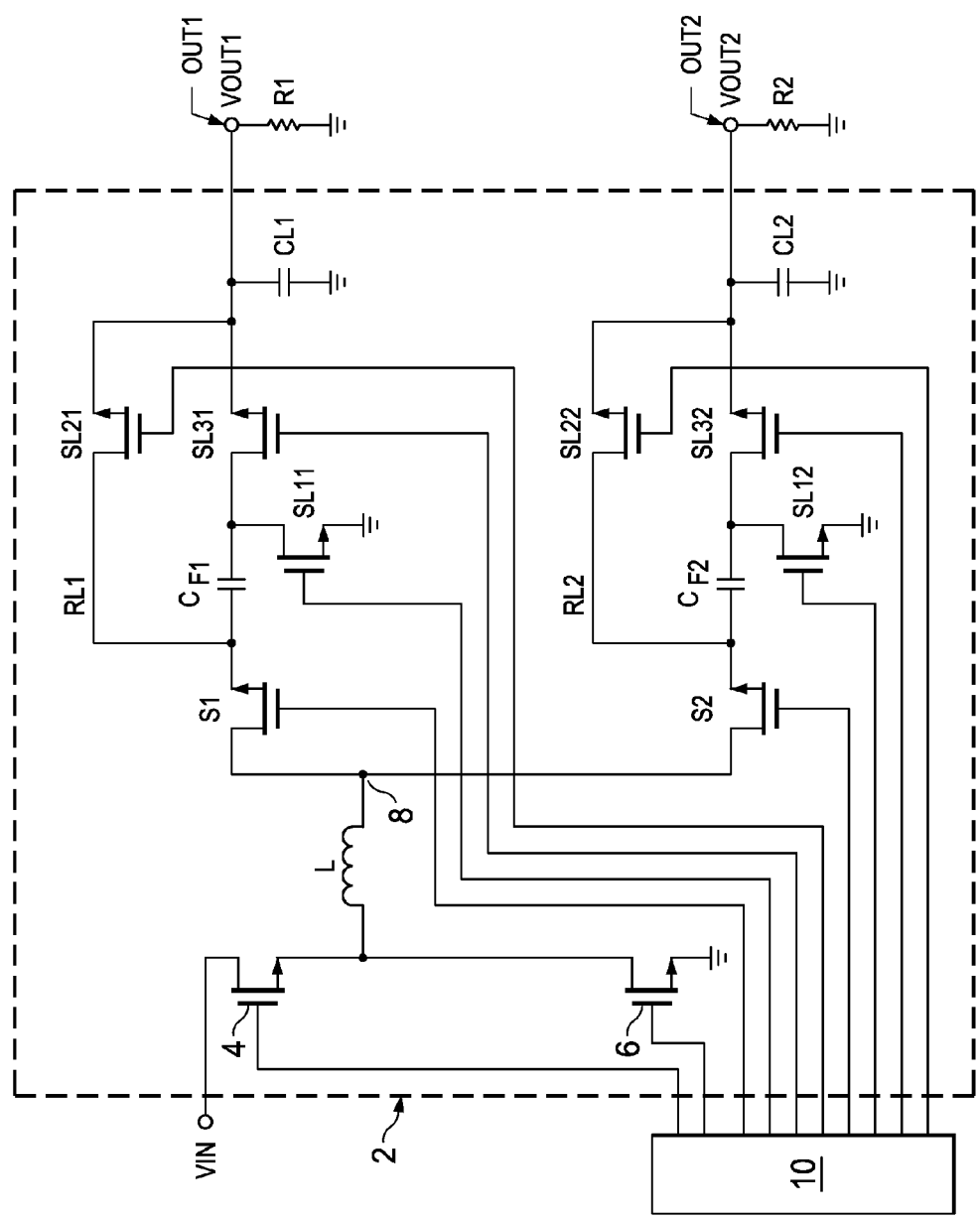
FIG. 9 is a simplified circuit diagram of a SIMO DC-DC converter, according to another embodiment of the invention.

FIG. 9 is a simplified circuit diagram of a SIMO DC-DC converter 2, according to an embodiment of the invention. An input voltage VIN is coupled to an input terminal which is further coupled to a first and a second switch 4, 6 which are coupled in series between the input voltage VIN and ground. The single inductor L of the SIMO DC-DC 2 converter is coupled to a node between the channel of the first and second switch 4, 6. The single inductor L provides a load current to the output node 8. By way of an example only, the SIMO DC-DC converter 2 according to the embodiment of FIG. 9 comprises a first and a second output line which is coupled to a first and a second output terminal OUT1, OUT2, respectively. Accordingly, there is a first and a second power switch S1, S2. Each output line comprises a charge pump having a capacitor CF1, CF2, a first switch SL11, SL12, a second switch SL21, SL22 and a third switch SL31, SL32. Each power output line further comprises a load capacitor CL1, CL2. An output voltage VOUT1, VOUT2 is coupled to a load resistor R1, R2 which is coupled to a respective output terminal OUT1, OUT2, by way of an example only. The first and second switch 4, 6, the two power switches S1, S2 and the first to third switch SL11, SL12, SL21, SL22 and SL31, SL32 may be semiconductor switches and may be controlled by a suitable control unit 10.

Figure 10:
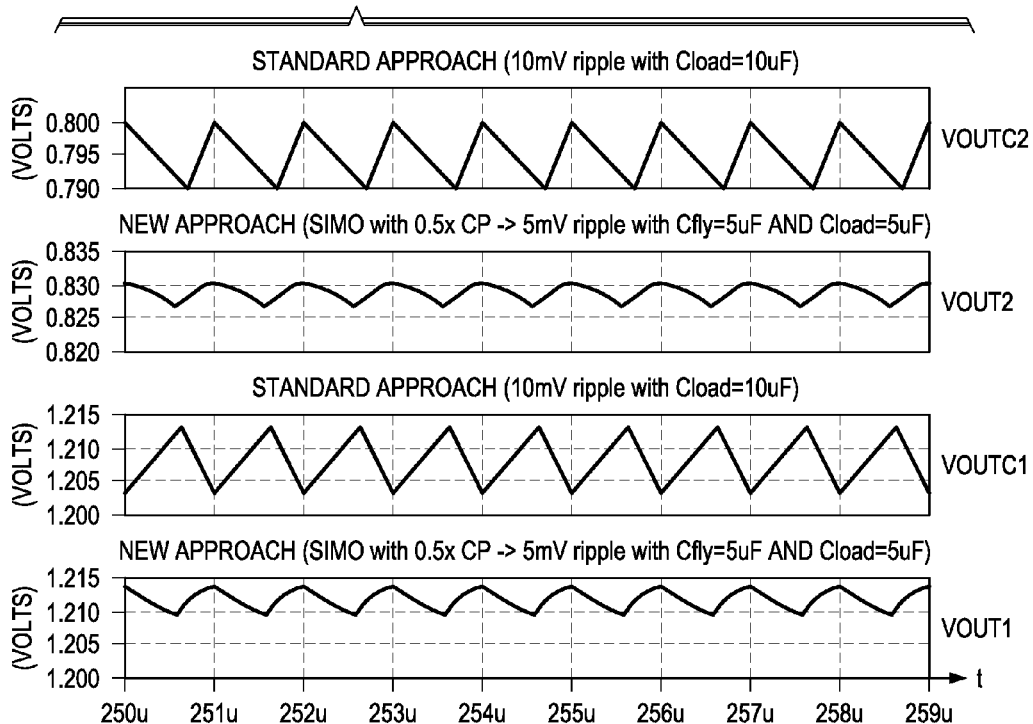
FIGS. 10 and 11 are simplified diagrams illustrating a time dependent output voltage of a SIMO DC-DC converter according to the prior art in comparison to a SIMO DC-DC converter according to embodiments of the invention.

FIG. 10 is a diagram illustrating simulation results for a time dependent output voltage VOUT1, VOUT2 of the SIMO DC-DC converter 2 of FIG. 9, which is configured according to an embodiment of the invention. Further, FIG. 10 comprises diagrams showing time dependent output voltages VOUTC1, VOUTC2 of the SIMO DC-DC converter 2 of FIG. 1, which is configured according to the prior art. By way of an example only, the input voltage VIN is 3.3 V for both, the SIMO DC-DC converter 2 according to the prior art (FIG. 1) and for the SIMO DC-DC converter 2 according to the embodiment in FIG. 9. The output voltage at the first output terminal OUT1 is set to 1.2V and the output voltage at the second output terminal OUT2 is set to 0.8V, for both SIMO DC-DC converters 2.

The capacitance of the load capacitor CL1 of the SIMO DC-DC converter 2 in FIG. 1 is 10 µF. In the embodiment of FIG. 9, the flying capacitors CF1, CF2 of the charge pump in the SIMO DC-DC converter 2 have a capacitance of 5 µF and the capacitance of the load capacitors CL1, CL2 is 5 µF. Accordingly, the sum of the capacitance of the flying capacitor CF1, CF2 and the load capacitor CL1, CL2 in the SIMO DC-DC converter 2 of FIG. 9 is equal to the capacitance of the load capacitor CL1, CL2 for the SIMO DC-DC converter 2 of FIG. 1.

In FIG. 10, the voltage ripple for the output voltage VOUTC1 and VOUTC2 at the output terminal OUT1 and OUT2 of the SIMO DC-DC converter 2 according to the prior art is about 10 mV. In contrast, the voltage ripple of the output voltages VOUT1, VOUT2 at the output terminals OUT1, OUT2 of the SIMO DC-DC converter 2 according to the embodiment in FIG. 9 is about 5 mV which is significantly smaller.

Figure 11:
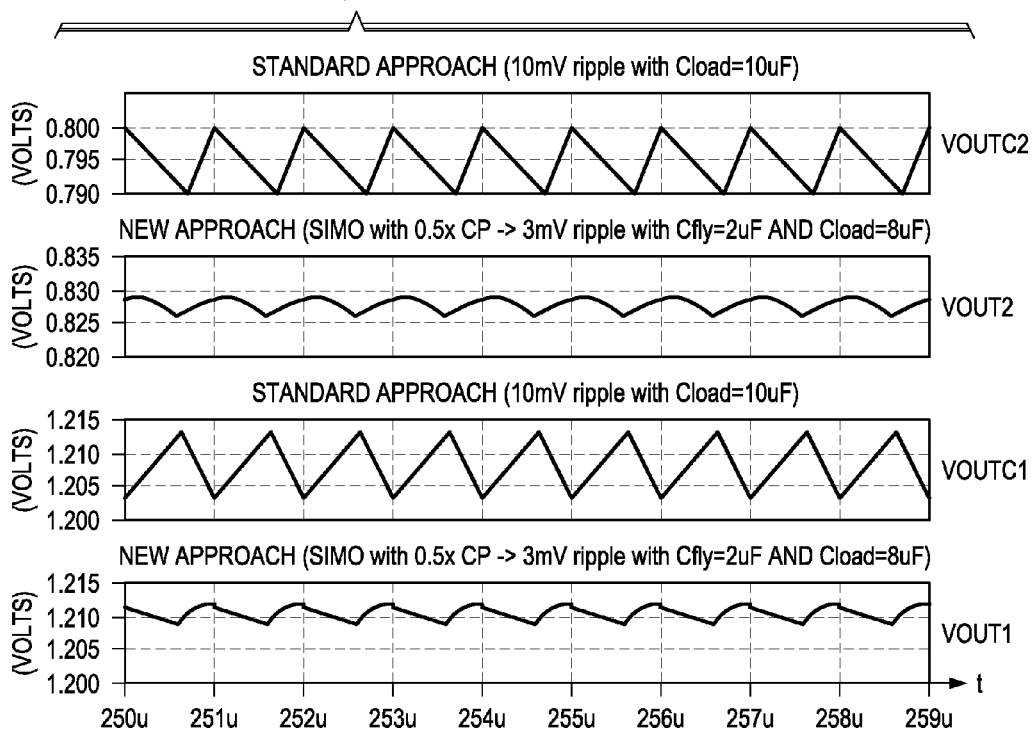

The voltage ripple may be further reduced if the capacitance of the flying capacitors CF1, CF2 of the charge pump is slightly lower and the capacitance of the load capacitors CL1, CL2 is slightly higher. Further simulation results are depicted in the time dependent voltage diagrams of FIG. 11. Again, the output voltages VOUT1, VOUT2 of a SIMO DC-DC converter 2 according to an embodiment are compared to the output voltages VOUTC1, VOUTC2 of a SIMO DC-DC converter 2 according to the prior art. According to an embodiment of the invention, the capacitance of the flying capacitors CF1, CF2 is 2 µF each and the capacitance of the load capacitor CL1, CL2 is 8 µF. The load capacitor CL1, C12 of the SIMO DC-DC converter 2 according to the prior art is 10 µF. Again, the sum of the capacitance of the flying capacitor CF1, CF2 and the load capacitor CL1, CL2 in a SIMO DC-DC converter 2 according to the embodiment of the invention is equal to the capacitance of the load capacitor CL1, CL2 in the SIMO DC-DC converter 2 according to the prior art.

The voltage ripple of the output voltage VOUTC1, VOUTC2 for the SIMO DC-DC converter 2 according to the prior art is 10 mV. In contrast, the voltage ripple for the output voltage VOUT1, VOUT2 of a SIMO DC-DC converter 2 according to the embodiment of the invention is reduced to 3 mV. Advantageously, the voltage ripple of the output voltage for the SIMO DC-DC converter 2 according to the embodiment is nearly four times smaller than the voltage ripple of the SIMO DC-DC converter 2 according to the prior art.

Although the invention has been described in detail, it should be understood that various changes, substitutions and alterations, may be made thereto without departing from the spirit or scope of the invention as defined by the appended claims.

The invention claimed is:

1. A single inductor-multiple output (SIMO) DC-DC converter, comprising:
an output node which coupled to the single inductor to receive a load current;
a plurality of output switches which are coupled to the output node for switching the load current from the output node to a plurality of output lines each having an output terminal and a load capacitor, wherein a plurality of output lines each comprise a charge pump which is coupled between the output switch and the load capacitor of the output line each of the plurality of output switches being alternatively closed for delivering power to the plurality of output terminals, wherein the charge pump comprises:
a capacitor having a first terminal which is coupled to the output switch and a second terminal which is coupled to the output terminal of the output line via a third switch;
a recovery line bypassing the capacitor;
a first switch having a first terminal which is coupled to the second terminal of the capacitor and a second terminal which is coupled to ground;
a second switch which is a part of the recovery line and which is for switching the recovery line;
wherein the third switch has a first terminal which is coupled to the second terminal of the capacitor and to the first terminal of the first switch, the third switch further comprises a second terminal which is coupled to the output terminal of the output line.

2. The SIMO DC-DC converter according to claim 1, wherein the SIMO DC-DC converter is configured to couple a voltage to the output node which is higher than the predetermined output voltage of a respective output line and the charge pump is a down-converting charge pump.

3. The SIMO DC-DC converter according to claim 2, wherein the SIMO DC-DC converter is configured to provide a voltage to the output node which X-times higher than a predetermined output voltage of an output line which is coupled to the output node and the charge pump of said output line is a down-converting charge pump having a transformation ratio of 1/X.

4. The SIMO DC-DC converter according to claim 3, further comprising a control unit which is configured to synchronize the operation of the charge pump of an output line to a power delivery period of the SIMO DC-DC converter at said output line.

5. The SIMO DC-DC converter according to claim 4, wherein the control unit is further configured to synchronize the first to third switch of the charge pump and the output switch of the output line.

6. The SIMO DC-DC converter according to claim 5, wherein the control unit is further configured to control the first to third switch of the charge pump and the output switch of the output line in that the first and second switch of the charge pump and the output switch have non overlapping open- and closed-state periods and the third switch of the charge pump and the output switch have overlapping open- and closed-state periods.

7. A method of operating a SIMO DC-DC converter comprising:
coupling an output node which coupled to a single inductor to receive a load current from the single inductor;
coupling a plurality of output switches to the output node for switching the load current from the output node to a plurality of output lines each having an output terminal, wherein a plurality of output lines each comprise a charge pump which is coupled between the output switch and the output terminal of the output line, wherein the charge pump is a down-converting charge pump and further comprises a capacitor having a first terminal which is coupled to the output switch and a second terminal which is coupled to the output terminal of the output line via a third switch, a recovery line bypassing the capacitor, a first switch having a first terminal which is coupled to the second terminal of the capacitor and a second terminal which is coupled to ground, a second switch which is a part of the recovery line and which is for switching the recovery line, wherein the third switch has a first terminal which is coupled to the second terminal of the capacitor and to the first terminal of the first switch, the third switch further comprising a second terminal which is coupled to the output terminal of the output line, and
synchronizing the operation of the charge pump of an output line and a power delivery period of the SIMO DC-DC converter at said output line, wherein each of the plurality of output switches being alternatively closed for delivering power to the plurality of output terminals and wherein synchronizing the operation of the charge pump of a certain output line and a power delivery period of the SIMO DC-DC converter at said output line comprises synchronizing the first to third switch of the charge pump and the output switch of the output line.

8. The method according to claim 7, comprising coupling a voltage to the output node which is higher than the predetermined output voltage of a respective output line and preferably, the voltage which is coupled to the output node during the power delivery period of the SIMO DC-DC converter is X-times higher than a predetermined output voltage for said output line and the charge pump is a down-converting charge pump having a transformation ratio of 1/X.

9. The method according to claim 7, wherein the first to third switch of the charge pump and the output switch of the output line are synchronized in that the first and second switch of the charge pump and the output switch have non overlapping open- and closed-state periods and the third switch of the charge pump and the output switch have overlapping open- and closed-state periods.

10. A portable electronic device comprising a single inductor-multiple output (SIMO) DC-DC converter according to claim 1.

* * * * *